(No Model.)

C. JENKINS.
VALVE.

No. 427,326. Patented May 6, 1890.

WITNESSES
J. M. Dolan
A. P. Porter

INVENTOR
Charles Jenkins
by his atty
Clarke & Raymond

UNITED STATES PATENT OFFICE.

CHARLES JENKINS, OF BOSTON, MASSACHUSETTS.

VALVE.

SPECIFICATION forming part of Letters Patent No. 427,326, dated May 6, 1890.

Application filed July 19, 1889. Serial No. 318,065. (No model.)

*To all whom it may concern:*

Be it known that I, CHARLES JENKINS, a citizen of the United States, and a resident of Boston, in the county of Suffolk and State of Massachusetts, have invented a new and useful Improvement in Valves, of which the following is a full, clear, and exact description, reference being had to the accompanying drawings, forming a part of this specification, in explaining its nature.

The invention refers to valves for steam and other purposes; and it relates especially to the valve-disk and the manner of securing or holding it to the spindle. The invention is represented as applied to a valve known as a "Globe Compression-Valve."

Figure 1:
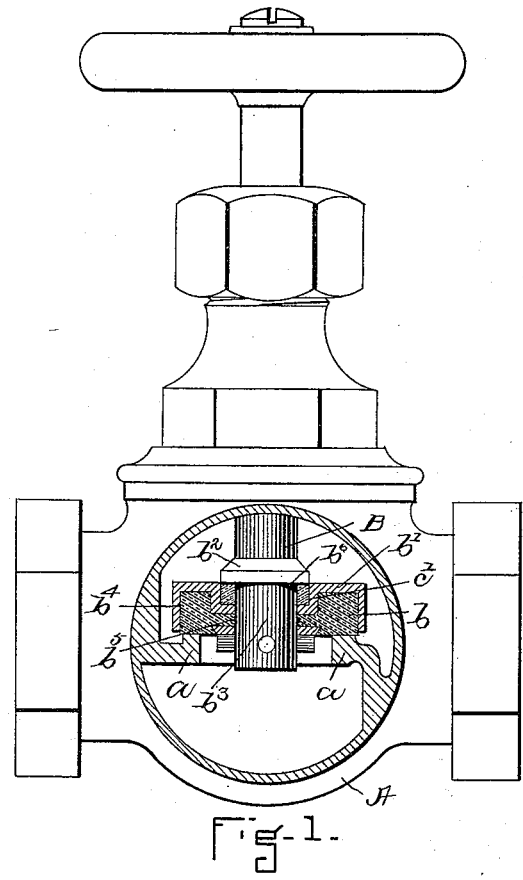
Figures 2, 3, 5:
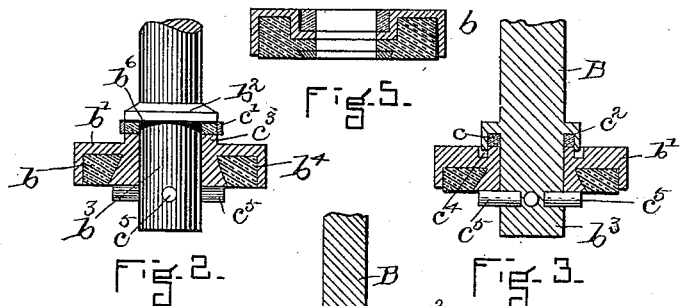
Figure 4:
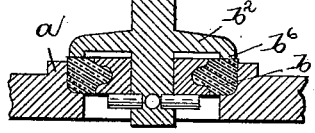

In the drawings, Figure 1 is a view in elevation of such a valve, a portion of the casing of the valve being removed to show the construction of the valve-disk and disk-operating spindle. Figs. 2, 3, and 4 are detail views, all of which will hereinafter be referred to. Fig. 5 is a view showing in section a valve-disk removed from the spindle of a valve.

In the drawings, A represents the casing of the valve; $a$, a raised seat; B, the compression stem or spindle; $b$, the packing, and $b'$ the packing-holder. In compression cocks and valves it is desirable that there be provision for the turning of the valve-operating spindle in relation to the packing, whereby upon the seating of the packing upon the stationary valve-seat further compressing or seating movement of the spindle shall not cause the packing to turn upon the seat, but shall simply act to force it against the seat, the turning of the spindle after such seating of the valve being in the packing-holder. It is a desideratum in valves of this character to make the connection between the stem or spindle and the packing-holder as simple as possible, as it is very desirable that they should not easily get out of order. It is also desirable that they be made at as low a cost as possible, and my invention secures both these results.

The spindle B is formed with a shoulder or flange $b^2$, which is integral therewith, and the section $b^3$, which is preferably round and of a length to receive the packing-holder and extend beyond the lower or inner surface thereof sufficiently to receive and hold a nut or pin. The metal holder and packing form a removable section or part of the valve. It is very desirable that such part should be easily removed and replaced, and also that it be in condition for immediate sale and use. The metal section of this portion of the valve may be in one or two parts. In Fig. 1 I have represented it in two sections, and in Figs. 2, 3, and 4 in one. In each view there is a recess $b^4$, which holds the packing $b$. This packing preferably is of vulcanizable stock containing refractory earthy or mineral matter, and it is secured to the metal section or sections by vulcanization, preferably under pressure in suitable molds. The metal holder also has, whether made in one or two sections, a hole $b^5$ of a size to fit the section $b^3$ of the valve-spindle, and this hole also extends through the packing, where the holder is shaped as represented in Fig. 1. Of course the packing-holder is not tightly fitted to the spindle, the spindle being free to turn therein. As the holder is not tightly fitted to the spindle, it is necessary to provide an additional or auxiliary seat to the valve, which upon the closing of the valve shall prevent steam from escaping or leaking about the section $b^3$ of the spindle. This auxiliary seat is formed by the under or inner surface $b^6$ of the flange $b^2$ and a ring or disk $c$ of compressible packing. This ring of packing may be held in the recess $c'$ in the metal packing-holder, as represented in Fig. 1, or it may be independent of the metal holder and placed between its upper surface and the surface $b^6$ of the flange $b^2$, as represented in Fig. 2, or it may be held in a recess $c^2$, formed in the flange $b^2$, as represented in Fig. 3, or it may be the upper surface of the main packing $b$, as represented in Fig. 4, in which case the flange $b^2$ is shaped to be brought into contact with it; but this last-named construction can only be employed when the upper surface of the main packing is exposed. Whichever form is employed, the bearing of the metal holder or packing against the surface $b^6$ of the flange should be less in area than the surface of the main packing $b$, which bears upon the main valve-seat $a$. This is to make the friction between the spindle and the metal holder less than the friction of the main packing upon the valve-seat, whereby the spindle turns in relation to the packing-holder, the packing-holder remaining stationary or substantially stationary on the main valve-seat.

In Fig. 2 the metal holder is shown as provided with a raised section $c^3$, to reduce the size of the bearing upon the packing $c$.

In Fig. 3 the packing $c$ is confined in a recess in the flange $b^2$, and the metal holder $b'$ has an annular recess or groove $c^4$ in its upper surface, of a size to permit the cylindrical section of the valve to close into it, the packing $c$ being thus confined on all sides by metal walls and seats. The holder and packing, which I term the "disk", is represented as held on the valve-spindle by pins $c^5$, which extend into or through holes formed in the end of the spindle; but of course the end of the spindle may be threaded and a nut used, if desired.

It will be observed that the disk is easily removable from the spindle of the valve, and thus works an improvement in the valve, because as a rule the packings of most compression-valves are not readily removed, and, so far as I am aware, no compression-valves have a removable disk which comprises a metal holder and a packing inserted in the holder, the metal holder being removable with the packing and another one substituted therefor; and in Fig. 5 I have represented in section a view of one form of the complete disk— that is, the form represented in Fig. 1, and as prepared for use and sale.

Having thus fully described my invention, I claim and desire to secure by Letters Patent of the United States—

1. The combination, in a compression-valve, of the valve-spindle B, having a flange $b^2$, a surface of which forms an auxiliary seat, with a removable disk comprising a metal packing-holder and compressible packing held by the holder, an auxiliary packing-seat of relatively small area interposed between the disk and the seat on the flange $b^2$, and the main seat of the valve, substantially as described.

2. The combination, in a compression-valve, of a valve-spindle having a valve-seat $b^6$, the valve having the main valve-seat $a$, an interposed metal plate or holder supporting or carrying two compressible packings or seats, one of which is relatively large and is adapted to be brought into contact with the main seat $a$, and the other of which is relatively small and is adapted to be held and compressed between the metal holder and the spindle-seat, substantially as described.

3. The combination, in a compression-valve, of the compression-spindle B, having a flange $b^2$, forming a bearing for the top of the holder and packing, and the section $b^3$, with the removable disk comprising the metal holder and packing $b$, carried thereby, having the hole $b^5$, whereby the said holder and packing are comparatively loosely fitted to the spindle and swivel thereon, and a holding device for securing the said disk to the spindle, substantially as described.

4. As an improved article of manufacture, the improved disk for compression-valves, comprising a metal holder, compressible packing held or confined in a recess of the holder and forming the main valve-seat, and a supplemental or auxiliary packing carried by said holder, substantially as described.

5. The arrangement and combination, in a valve or cock, of a main valve-seat, a valve-disk, the valve-spindle, a removable disk comprising a metal holder and an attached compressible packing, which disk is free to turn upon the valve-spindle, and a supplemental or auxiliary packing between the main disk and a seat or projection upon the spindle, as and for the purposes described.

CHARLES JENKINS.

Witnesses:
F. F. RAYMOND, 2d,
J. M. DOLAN.